US007464102B2

(12) United States Patent
Colleran et al.

(10) Patent No.: US 7,464,102 B2
(45) Date of Patent: Dec. 9, 2008

(54) SYSTEM AND METHOD FOR PROVIDING COMPUTER SUPPORT TOOLS

(75) Inventors: John D. Colleran, Redmond, WA (US); Corneliu I. Lupu, Sammamish, WA (US); Kinshuman Kinshumann, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 10/722,717

(22) Filed: Nov. 26, 2003

(65) Prior Publication Data

US 2005/0114362 A1    May 26, 2005

(51) Int. Cl.
*G06F 17/00* (2006.01)
*G06F 3/00* (2006.01)
*G06F 9/44* (2006.01)

(52) U.S. Cl. .................... 707/102; 715/705; 717/168
(58) Field of Classification Search ............... 707/1–10, 707/100–104.1, 200–205; 717/120–122, 717/172–173, 177–178, 168; 715/705
See application file for complete search history.

(56) References Cited

U.S. PATENT DOCUMENTS

| | | | |
|---|---|---|---|
| 5,781,735 A * | 7/1998 | Southard | 709/224 |
| 5,974,454 A * | 10/1999 | Apfel et al. | 709/221 |
| 6,205,579 B1 * | 3/2001 | Southgate | 717/173 |
| 6,256,773 B1 * | 7/2001 | Bowman-Amuah | 717/121 |
| 6,341,373 B1 * | 1/2002 | Shaw | 717/173 |
| 6,353,926 B1 * | 3/2002 | Parthesarathy et al. | 717/170 |
| 6,675,382 B1 * | 1/2004 | Foster | 717/177 |
| 6,883,168 B1 * | 4/2005 | James et al. | 717/178 |
| 6,986,133 B2 * | 1/2006 | O'Brien et al. | 717/173 |
| 2002/0026634 A1 * | 2/2002 | Shaw | 717/173 |
| 2003/0121024 A1 * | 6/2003 | Hill et al. | 717/107 |
| 2004/0060035 A1 * | 3/2004 | Ustaris | 717/100 |
| 2004/0230971 A1 * | 11/2004 | Rachman et al. | 717/175 |
| 2005/0010311 A1 * | 1/2005 | Barbazette et al. | 700/78 |

* cited by examiner

*Primary Examiner*—Hosain T Alam
*Assistant Examiner*—Navneet K Ahluwalia
(74) *Attorney, Agent, or Firm*—Workman Nydegger (57) ABSTRACT

A system and method for delivering support tools to a computer user's machine, without requiring the user to directly download, install and/or execute the tools. A user in need of support contacts support and in response receives a URL corresponding to a manifest, which is a data file identifying support tools that a user's machine is to run to collect data for analysis. Via HTTP, a control mechanism on the user's machine interprets the manifest, automatically handling downloading and installation of any needed tool, and executes the tools on the machine with appropriate parameters that are present in the manifest. Data is collected, packaged and returned to a support entity, where it is analyzed such that a support solution may be returned to the user. The system and method provide efficient and consistent support to computer users, helping both support personnel while giving computer users a very straightforward support experience.

10 Claims, 10 Drawing Sheets

SYSTEM AND METHOD FOR PROVIDING COMPUTER SUPPORT TOOLS

FIELD OF THE INVENTION

The invention relates generally to computer systems, and more particularly to providing support to computer systems and their users.

BACKGROUND OF THE INVENTION

A significant expense for computer software (and hardware) manufacturers is the cost of support. In general, the primary mechanism for diagnosing a problem that a user is having with a computer is via telephone. Support calls handled by support technicians come from computer users of widely varying technical skill levels.

As a result, the quality of the support that can be provided is often limited by the technical ability of the customer to verbally describe the problem, as well as the experience of support technician in interpreting what the customer is able to describe. For example, by asking the right questions, an experienced technician may be able to recognize a pattern and lead even a novice computer user to a solution. However, a lesser-experienced support technician may not ask the best questions, and/or may be misled by an answer, or otherwise confused by what a user is describing. This leads to inconsistent support, frustrating users and technicians alike, and generally adding to the cost of support.

One attempt to remove some of the technical responsibilities from the user provided a report tool that essentially gathered megabytes of data from a machine that was having a problem. The data, which took a great deal of time to collect and upload, was then analyzed by a technician. However, the sheer amount and breadth of the data made such analysis very difficult, and often did not result in a solution being found.

What is needed is a consistent way for users and support technicians to interact to resolve computer problems. The support should make it as simple as possible for users to participate, should be consistent for technical support staff, and facilitate automation to the extent available.

SUMMARY OF THE INVENTION

Briefly, the present invention provides a system and method that operates to remove the complexity involved with solving computer problems from both the perspective of users and a support entity (e.g., technical personnel). For example, in many situations a user will be able to solve a computer problem by simply requesting help and clicking on a single link (e.g., URL) that a support entity has provided in response to that request. This straightforward operation, along with techniques to determine what tools a user needs, makes the problem resolution experience more consistent to users. At the same time, the present invention operates to make support technicians more efficient and consistent, in some cases even eliminating the need for human intervention in the support process.

In general, technical professionals at the support entity develop solutions to known computer problems along with tools to determine whether a given computer needs one of these solution. Problems can be detected on a particular machine by executing tools to collect data for analysis. Once analyzed, the support entity can then provide an appropriate solution.

To determine which tools are needed for a problem, a user can provide basic information, such as by filling out a form emailed or otherwise provided to a support entity. The form may be analyzed by a person or automatically to determine which tools are needed. In one implementation, HTTP is leveraged to locate an appropriate manifest comprising a data file that identifies the tools, along with other information (e.g., parameters) needed to run the tools. To this end, support provides a URL corresponding to the manifest in response to a request for support, whereby, for example, the user need only click on the URL to be given access to the correct manifest.

A control mechanism (e.g., an ActiveX® control) on the user machine executes each tool. The control first will download and install a given tool if not already present on the user machine, including verifying that any existing tool that is installed is the correct version of that tool (e.g., the most recent version that is appropriate for the particular operating system). The control mechanism also executes a program to package up the resulting data and deliver it to a central support depository for analysis. If a known problem is detected from the data, a solution can be sent to the user. The analysis process can be automated to an extent, eliminating the need for support personnel in many situations.

Other advantages will become apparent from the following detailed description when taken in conjunction with the drawings, in which:

DETAILED DESCRIPTION

Exemplary Operating Environment

Figure 1:
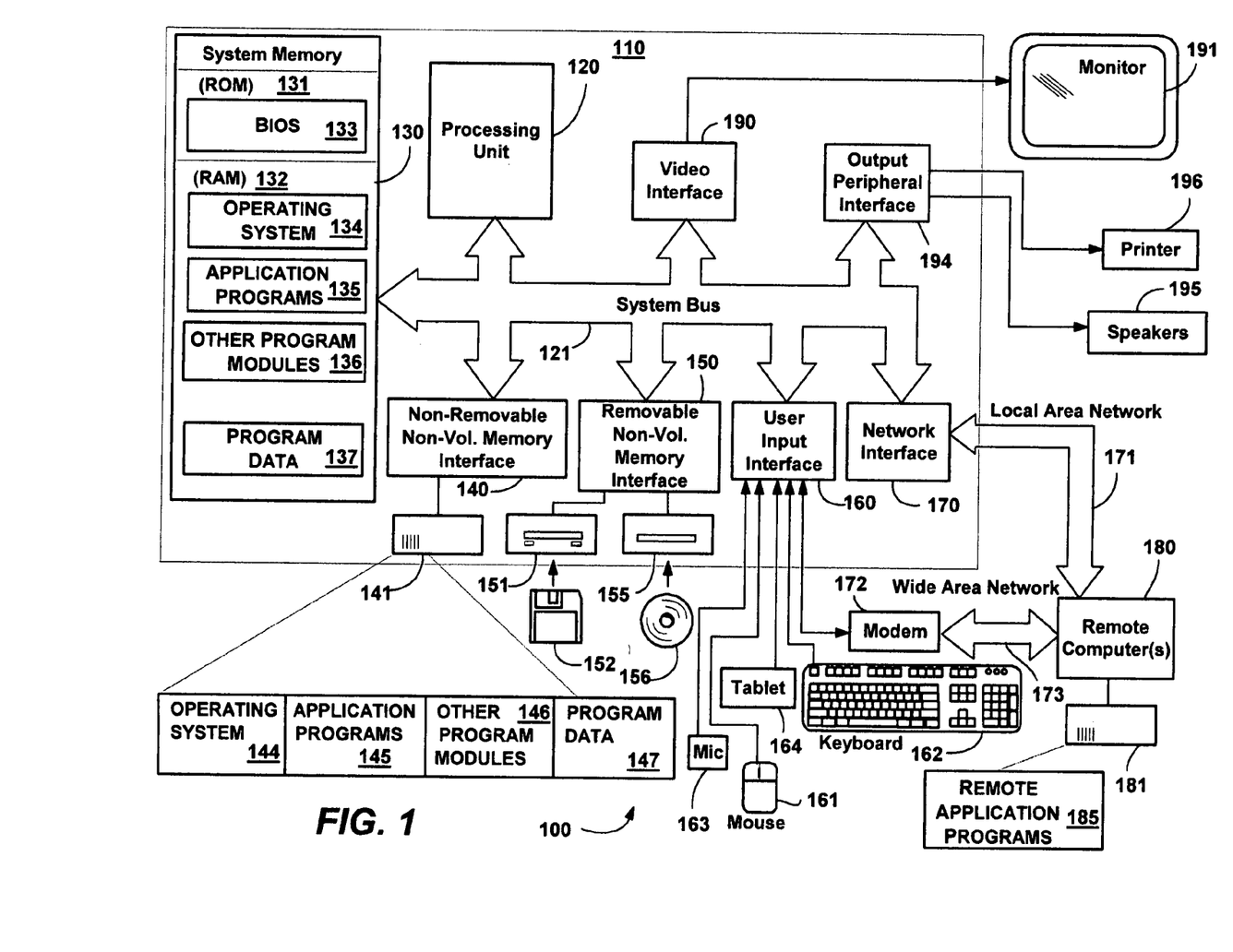
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A Consistent Front End for Computerized Support Tools

The present invention is, in part, generally directed towards providing computer users with a simple to use, efficient and consistent computer support experience, particularly in resolving problems that would ordinarily be handled via one or more telephone calls. Although the examples herein are generally directed towards solving a wide variety of computer hardware and/or software-related problems, such as those that an operating system might deal with, e.g., hardware device problems, driver issues, networking problems, compatibility issues and so forth, it is understood that the present invention can be implemented in a much narrower environment. For example, the present invention may be used to provide support for a single application program, in which only a relatively small number problems are encountered, each related to that particular program.

As will be understood, the present invention generally operates so as to remove from computer users much of the complexity involved with solving computer problems. For example, as described below, in many situations with the present invention, a user will be able to solve a computer problem by simply requesting help and clicking on a single link that a support entity has provided in response to that request. Further, the present invention attempts to make the problem resolution experience more consistent to users, e.g., many times users will be able to fill out a form that is the same form that other users having the same problems will receive. At the same time, the present invention operates to make support technicians more efficient and consistent, in some cases even eliminating the need for human intervention in the support process.

Figure 2:
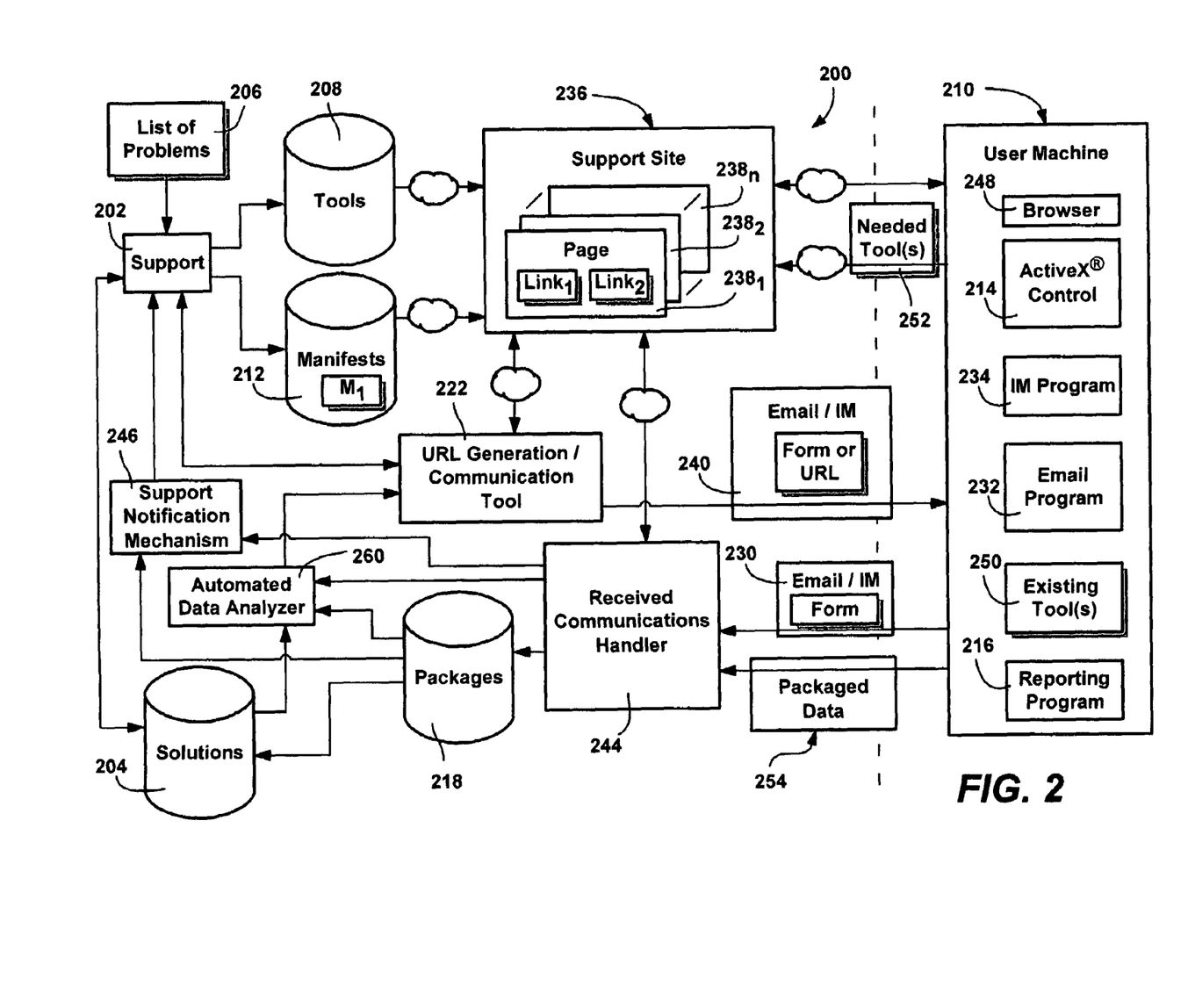
FIG. 2 is a block diagram generally representing an example architecture used to communicate support-related data to provide support, in accordance with an aspect of the present invention.

FIG. 2 represents an example architecture 200 into which the present invention may be incorporated. In general, software support is provided by some support entity 202, such as technical professionals employed by a software manufacturer or a third party associated with that manufacturer. The entity 202 develops solutions 204 to known computer problems 206, along with tools to determine whether a given computer needs such a solution. As will be readily apparent, the system and method of the present invention may take tools developed by different teams and abstract the differences away, whereby the end user only needs to make a request about the problem and the tools would be loaded, executed and data returned to the support person or interpreted locally, without having to have people deal with the wide variety of tools that exist in the real world. Similarly it allows a support professional to easily package up actions unique for a specific problem and deliver that action.

More particularly, as is known, following a product release, problems become known over time to the support entity 202, resulting in some recognized list (or the like) of problems 206 being accumulated. The list 206 may be processed by support professionals 202 into software (e.g., diagnostic) tools maintained in a store 208 of such programs that are able to collect data from computer systems for later analysis, and/or directly examine computer systems for known problems. Such problems may be caused by virtually anything, e.g., a computer virus, a library version (e.g., DLL) installed with one program that adversely impacts another program, a hardware device being installed that needs a new driver, a network setting that has changed for whatever reason, and so on.

When such problems are reported frequently enough, not only are they added to the list 206, but a recognizable signature (pattern) develops. This pattern can be detected on a particular machine (e.g., user machine 210) by gathering data from that machine via an appropriate set of one or more tools 208 (which may need to be developed for that problem) that are executed on the affected machine, and then analyzing that data. The support entity 202 then develops an appropriate solution (or set of solutions), and adds the solution to the store of solutions 204, so that the problem can be quickly resolved whenever it comes up in the future.

As described above, collecting all of a machine's data is not a very practical solution. Separate tools can collect more specific data, however whenever a request for support is received, it is not practical to run every one of the hundreds of tools that may exist on every machine having a problem. Thus, one difficulty that leads to significant support costs is figuring out which tool or tools should be run on a given machine; indeed this is where technicians have heretofore needed to rely on the user for information. For example, one of the first things that support technicians do when contacted by a user is to walk the user through a set of questions in an attempt to narrow down the problem, so that an appropriate tool or subset of tools can be decided upon and then executed. As also described above, this leads to inconsistencies due to the varied skill levels of users and technicians. Moreover, this approach causes a second problem, in that even once narrowed down, users are required to download, install and execute the tools, possibly with certain command-line parameters, which is beyond the ability level of many users.

In accordance with an aspect of the present invention, much of the difficulty encountered by users and support personnel when resolving problems is eliminated by performing many of the user's tasks (those that were heretofore required to accomplish problem solving) on the user's behalf with little user action. In one implementation represented in FIG. 2, this is accomplished by leveraging HTTP to locate an appropriate manifest of a set of manifests 212, along with a control mechanism 214 (e.g., an ActiveX® control, or simply "control") automatically loaded and executed (e.g., via a script) on a user's machine. As described below, each manifest (e.g., M1) is a named data file that among other things identifies which tool or tools need to be run to collect relevant data. For example, there may be a manifest related to tools for solving hardware problems, another related to tools for solving networking problems, another related to tools for solving virus problems, and so forth. The manifest also provides information such as parameters for running the tool with an appropriate configuration. Thus, in general the manifest describe the tools to run, including a location from which the tool can be downloaded, the current version, how it should be installed (e.g., as a plain copy or as a "run MSI" package), what parameters should be specified and what output should be collected.

In keeping with the present invention, as described below, the control 214 interprets the manifest $M_1$ that was deemed to be best for detecting the problem, installs, as necessary, the tool or tools identified in that manifest $M_1$, executes the tools, and also executes a reporting program 216 to package up the resulting data and deliver it to a central packages support depository 218. Note that interpreting the manifest $M_1$ via the control 214 eliminates the need for users to be involved with the process of downloading, installing and/or executing the tools.

To obtain the control and interpret the correct manifest, in one alternative, the user calls by phone, emails a message or sends an instant message 230 (e.g., via an email program 232 or via an instant messaging program 234) or otherwise contacts support 202. In response, the user ultimately obtains from a generation/communication tool 222 a link (e.g., a URL or uniform resource locator) to a backend tool page or the like of a support website 236 corresponding to the manifest, e.g., $M_1$. The URL generation/communication tool 222 may be a very simple tool that generates a URL and/or sends email, and can be automated, manual or combination. In general, the support website 236 comprises a set of individual web pages 2381-238n that each provides a GUI front end that describes an individual tool. Note that using a URL is only one implementation of the invention, and it is understood that it is straightforward to abstract this to some other presentation, such as an icon representing type of issues that when clicked invokes the URL (makes an HTTP request).

By clicking the URL link, the user also automatically obtains the control 214 that is capable of interpreting the manifest M1, (although the control may be already present on the user's machine). As described below, running the control 214 interprets the manifest at the support site 236, e.g., the manifest M1 may correspond to a page $238_2$. The control 214 automatically downloads and installs (if needed) the appropriate tool or tools, and executes the tools to collect the relevant data for packaging and returning for analysis.

Note that there are thus numerous ways for a computer user to contact support 202 in order to obtain the desired URL. For example, this may involve a number of back-and-forth communications, e.g., a user may call via phone, send the above-described email or instant message 230, and in return (such as an emailed response 240) receive the manifest's URL or a form. If a form, e.g., a form directed to narrowing the problem to a particular tool or set of tools, the user can fill out the form by answering its questions, return the form and receive an appropriate URL in response. For example, if not already known, the form might request the user's email address, and further ask questions such as, "are you having trouble with a physical device?" and if so, "which device—CD-ROM, monitor, modem?" and so on. Based on the answers, a technician or automated process at the support end 202 can provide the URL that corresponds to the manifest that is appropriate for collecting data for that particular class of problems. Note that in this scenario, support technicians are not tied up with a single user like is required in real-time problem solving, but rather can work simultaneously with multiple users, such as to work with one user's problem while the forms are being filled out by other users or while the tools are being loaded and run by still other users.

At the support end, a mechanism such as a received communications handler 244 may route the incoming mail or message accordingly, e.g., forwards the email or instant message, or instructs a notification mechanism 246 to contact a technician. In many cases this may be the same technician that spoke with a user and/or sent a form to the user, but it may be a different technician. Indeed, certain technicians may specialize in getting appropriate forms to users, while others may specialize in reviewing the filled-out forms to select a manifest, with possibly still others specializing in analyzing results obtained from the tools.

In another alternative, a user may navigate to a support page (e.g., a home page $238_1$ of the support website 236 or another site) via a browser component 248, such as by navigating to that page directly, without necessarily having first contacted support. From there, for example, the user may answer questions, e.g., by filing out forms, in order to narrow down the types of possible problems, and be directed to an appropriate page $238_2$-$238_n$ of that website 236 (or suitable page of another website, not shown). Note that in this alternative, the web pages may be available for direct access, instead of having support send the actual URL. For example, one or more web pages (e.g., a home page $238_1$ and/or some sub-pages) may be arranged to help locate a specific page related to a problem, e.g., a web page may have a link to a page with one or more URLs listed for people with networking problems; another link may be to a web page with list of URLs for people with virus problems, and so on. Some troubleshooting-like (e.g., question-and-answer) interfaces can guide the user to the correct page, that is, the page corresponding to the manifest deemed best for resolving the problem.

Once the user connects to the correct page/manifest (e.g., the page $238_2$) of the backend tool, whether by clicking a link in an email message or by being transferred there from another page, or in some other manner such as by typing the URL into a browser's command line, the control 214 is executed on the user machine. The control 214 may first be automatically downloaded and installed, if necessary. In one implementation, the URL includes the parameters needed by the control, such as the identity of the appropriate manifest file (e.g., $M_1$) that needs to be interpreted, and also possibly a per-case identifier (e.g., service request number) to track the request as necessary.

In general, and as described below with reference to FIGS. 3 and 4, the control 214 walks the manifest $M_1$, running the one or more tools identified therein after downloading and installing those tools as necessary. Note that the user machine 210 may have some existing tools 250 already present thereon, and if so, these are used, provided the correct version is present as matched against version information in the manifest. Note that such tools ordinarily will not be shipped with the user machine, but rather will be tools developed by the support entity 202 and that will evolve over time, leading to various versions.

If a needed tool is not present on the machine 210, the control sends back a request 252 to download and install any needed tools, which then become part of the set of existing tools 250. These tools are executed to obtain the necessary data. Note, however, that in keeping with the present invention, no user intervention is required with respect to downloading, installing or executing the tools with the correct parameters, as this information is in the selected manifest (e.g., $M_1$) and automatically processed by the control 214.

The data obtained by the tools are then collected and packaged by the reporting program 216 (as operated by the control 214) for transmission back to the support entity 202. In one implementation, the Windows® Error Reporting mechanism is leveraged to act as the reporting program 216. This exists as an operating system component on contemporary Windows®-based machines, and sends back packaged data 254 to a collection site, that is, to the support entity's packages repository 218. Note that although virtually any transmission mechanism may be alternatively used, the Windows® Error Reporting mechanism was chosen for one implementation because it was already present contemporary Windows®-based machines, and thus there was no reason to duplicate the mechanism.

At the support end, the received communications handler 244 routes the packaged data accordingly, such as by storing the data among other sets of packages 218 for subsequent analysis, as well as possibly instructing the notification mechanism 246 to inform a technician that the tools have been run and the data is ready for analysis. Note that the data delivered to the back end may be used for quantitative trend analysis, as well as for individual machine diagnosis.

The data may be analyzed by the technician, and/or an automated data analyzer 260 may look at the package, such as to look for a signature of a known problem. Note that the automated data analyzer 260 needs to know the format of the data output by the tools that generated the data, but otherwise can be virtually any analysis mechanism. If a known problem is detected, support 202 provides a solution from the set of solutions 204, which may be in virtually any form, including text instructions, a program or script to run to cure the problem, and so on. The chosen solution may comprise an instruction to run another tool subset, e.g., interpret another manifest to gather different data.

Note that data analysis may involve a technician, but at times may be fully automated. For example, once the user clicks on a URL, which may or may not have required a technician, the user receives a solution, again possibly without involving a technician. As can be readily appreciated, avoiding technicians whenever possible can provide a significant savings.

Figure 3:
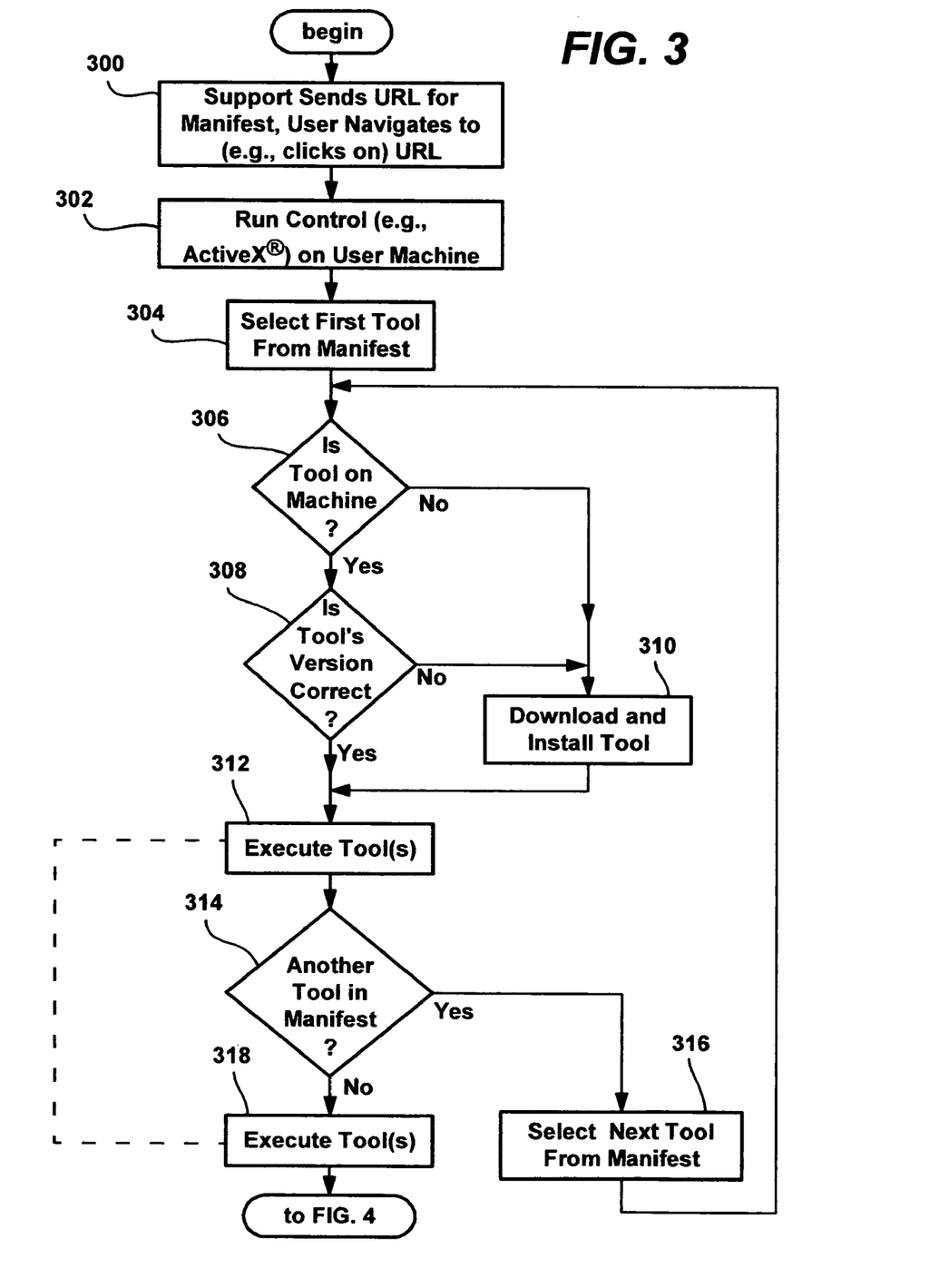
FIGS. 3 and 4 comprise a flow diagram generally representing an example process used to provide support to a user, in accordance with an aspect of the present invention.
Figure 4:
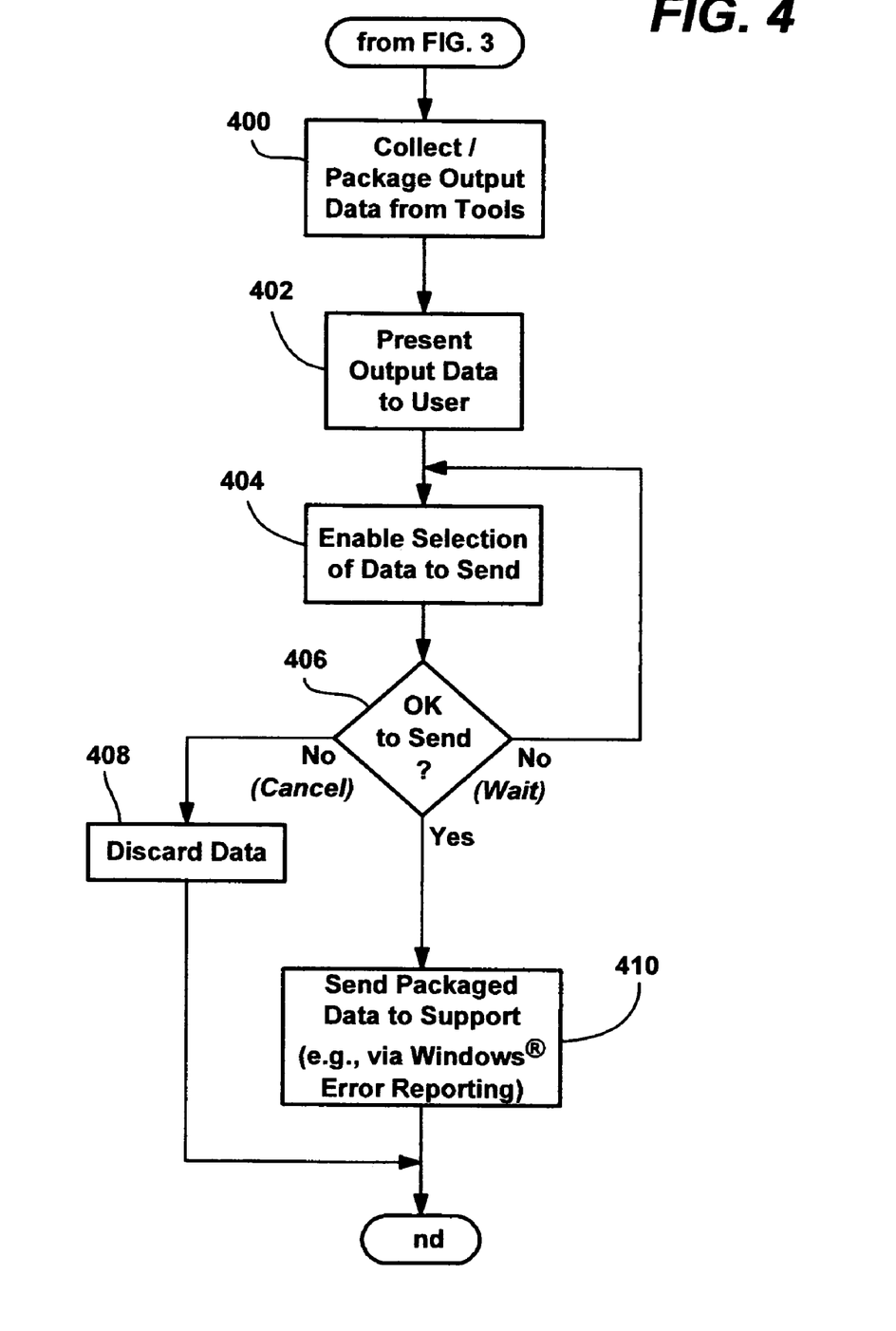

Turning to an explanation of the operation of the present invention with particular reference to FIGS. 3 and 4, the process starts when support sends (or otherwise makes accessible) a URL corresponding to the manifest, as represented at step 300. As described above, this is typically after obtaining some information that narrows the user's problem to some class of problems corresponding to a subset of tools that are likely to find the problem. Note that a manifest is used in the example implementation described herein, although it is feasible to identify a tool to run in other ways.

Step 302 represents running the control 214 on the user machine 210, which typically occurs as the user clicks on the URL at step 300. As is known with other types of controls, a site corresponding to the URL can send the control if not already present on the user's machine 210. Step 304 represents the control 214 beginning to interpret the manifest, by selecting the first tool listed in the manifest.

Step 306 tests for whether the selected tool already exists on the user machine 210. If so, step 308 represents testing the selected tool's version. If not installed on the machine, or installed but not the correct version, the needed tool is downloaded and installed via step 310. Note that if appropriate, the control 214 may remove a tool, such as an obsolete version.

As can be readily appreciated, there are many combinations and permutations regarding execution of one tool versus executing another tool versus downloading and installing other tools. For example, certain tools may be able to be run at the same time as other tools, while certain other tools may conflict with one another and/or have to run in a particular order. As another example, certain tools may be able to execute while another tool is being downloaded and installed, which can save time, e.g., by collecting data as one or more other tools are being downloaded and installed. Thus, although not necessary to the present invention, the execution of the tools may be arranged such that considerable amount of simultaneous actions may be efficiently occurring. The information on how to execute a given tool with respect to simultaneous execution of another tool and/or downloading/installing may be guided by the manifest, using ordering and/or virtually any flagging mechanism or the like.

In FIG. 3, step 312 represents being able to execute any one or more tools (in parallel, or in sequence, or some in parallel and others in sequence) that may occur while steps 314 and 316 are downloading and install other needed tools. Step 318 represents executing any tools that could not be executed in this manner, but rather had to wait for downloading and installation to complete. Such tools may also execute in parallel, or in sequence, or some in parallel and others in sequence.

Once the tools have run, step 400 of FIG. 4 represents the collecting and packaging of the data output by the tools. Note that step 400 may also be performed to an extent while other tools are running. Step 402 represents presenting the data, e.g., some textual description thereof, to the user, who can then choose to send all or part of the data to support. This is essentially for privacy purposes, but may also help with efficiency; e.g., a user having trouble with a CD-ROM may note that a tool has collected information apparently unrelated to the CD-ROM. Steps 404 and 406 give the user the ability to selectively turn off certain sets of data to send, or cancel and discard the whole collection (step 408), or send the selected data to the support entity 202 (step 410).

In this manner, a user is provided with a very straightforward and consistent way to interact with support to resolve a problem. At the same time, support may be more consistent, and made far more efficient.

Although the present invention was described in the context of leveraging HTTP for machines having internet access, it should be understood that internet access is not necessary. For example, in a data-critical environment comprising carefully administered machines that are not connected to the internet, an administrator may receive the tools, control and manifest on one machine (e.g., that is connected to the Internet), and then use a network share or portable media such as a DVD-ROM to transport the tools and manifest. Support can also provide a media, e.g., a burned CD-ROM, by hand-delivery if necessary. In other words, the network share or the media acts as the site having the control, manifest and tools for the isolated machine. The packaged data can be likewise transported back to support via the media or by communicating the data from the network share back to support. A service request number may be used to track the data that is exchanged.

The following is an example manifest:

```
<TOOLS>
    <TOOL>
        <NAME>Collect network configuration (ipconfig.exe)
        </NAME>
        <COMMANDLINE>ipconfig.exe /all</COMMANDLINE>
        <OUTPUTFILE>
            <FILE_NAME>%temp%\ipconfig.txt</FILE_NAME>
            <STDOUT />
        </OUTPUTFILE>
        <TIME>1000</TIME>
        <CHECKED></CHECKED>
    </TOOL>
    <TOOL>
        <NAME>Collect the Product ID (reg.exe)</NAME>
        <COMMANDLINE>reg query
```

-continued

```
HKLM\Software\Microsoft\Windows\CurrentVersion /v
ProductID</COMMANDLINE>
        <OUTPUTFILE>
            <FILE_NAME>%temp%\productid.txt</FILE_NAME>
            <STDOUT />
        </OUTPUTFILE>
        <TIME>1000</TIME>
        <CHECKED></CHECKED>
    </TOOL>
    <TOOL>
        <NAME>Collect the program groups (wmic.exe)</NAME>
        <COMMANDLINE>wmic path Win32_ProgramGroup get
/value</COMMANDLINE>
        <OUTPUTFILE>
            <FILE_NAME>%temp%\pgroups.txt</FILE_NAME>
            <STDOUT />
        </OUTPUTFILE>
        <TIME>1000</TIME>
        <CHECKED></CHECKED>
    </TOOL>
    <TOOL>
        <NAME>ACL information for system.ini (cacls.exe)</NAME>
        <COMMANDLINE>cacls.exe %windir%\system.ini
        </COMMANDLINE>
        <OUTPUTFILE>
            <FILE_NAME>%temp%\cacls.txt</FILE_NAME>
            <STDOUT />
        </OUTPUTFILE>
        <TIME>1000</TIME>
        <CHECKED></CHECKED>
    </TOOL>
    <TOOL>
        <NAME>Collect the available application terminal servers on
the network (qappsrv.exe)</NAME>
        <COMMANDLINE>qappsrv.exe /CONTINUE
        </COMMANDLINE>
        <OUTPUTFILE>
            <FILE_NAME>%temp%\TS.txt</FILE_NAME>
            <STDOUT />
        </OUTPUTFILE>
        <TIME>1000</TIME>
        <CHECKED></CHECKED>
    </TOOL>
    <TOOL>
        <NAME>Collect system information (msinfo32.exe)</NAME>
        <COMMANDLINE>%windir%\system32\
        dllcache\msinfo32.exe /nfo
%temp%\msinfo32.nfo</COMMANDLINE>
        <OUTPUTFILE>
            <FILE_NAME>%temp%\msinfo32.nfo</FILE_NAME>
        </OUTPUTFILE>
        <TIME>1000</TIME>
    </TOOL>
</TOOLS>
```

FIGS. 5-10 are example screen shots showing how a user might interact with a computer system to obtain remote support. Note that FIGS. 5-11 are only a portion of what a user might see, and that there are likely to be introductory, intermediate and ending screen shots and dialogs that a user would see in an actual support session.

Figure 5:
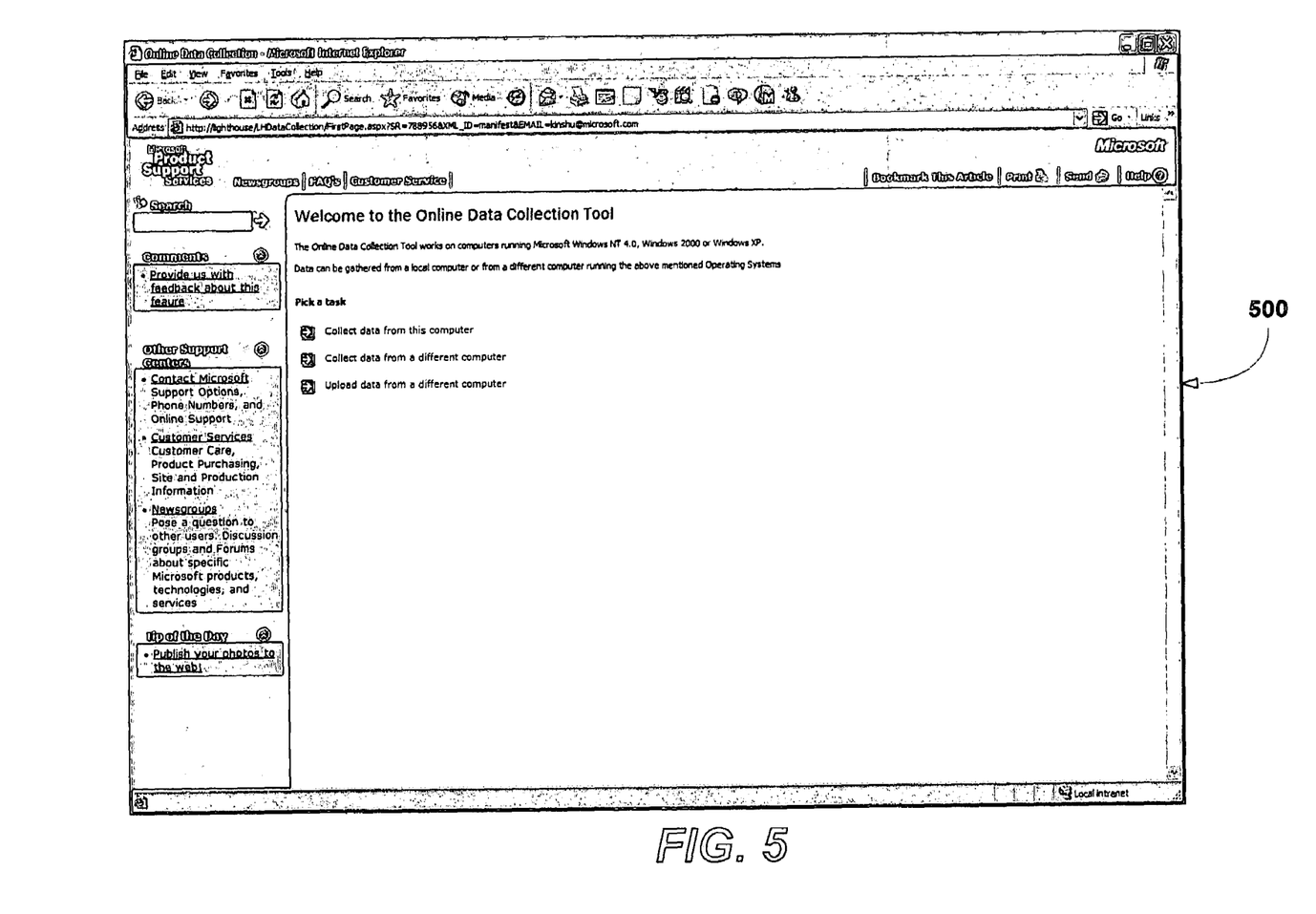
FIGS. 5-8 are representations of example screen shots seen by a hypothetical user when interacting with remote support, in accordance with an aspect of the present invention.

As represented in FIG. 5, when a user logs onto remote support, an interface 500 is displayed to the user that allows the user to select tasks. Note that data may be collected from the current computer, or from a different computer, e.g., one that is connected in some manner and that the user such as an administrator has rights to access.

Figure 6:
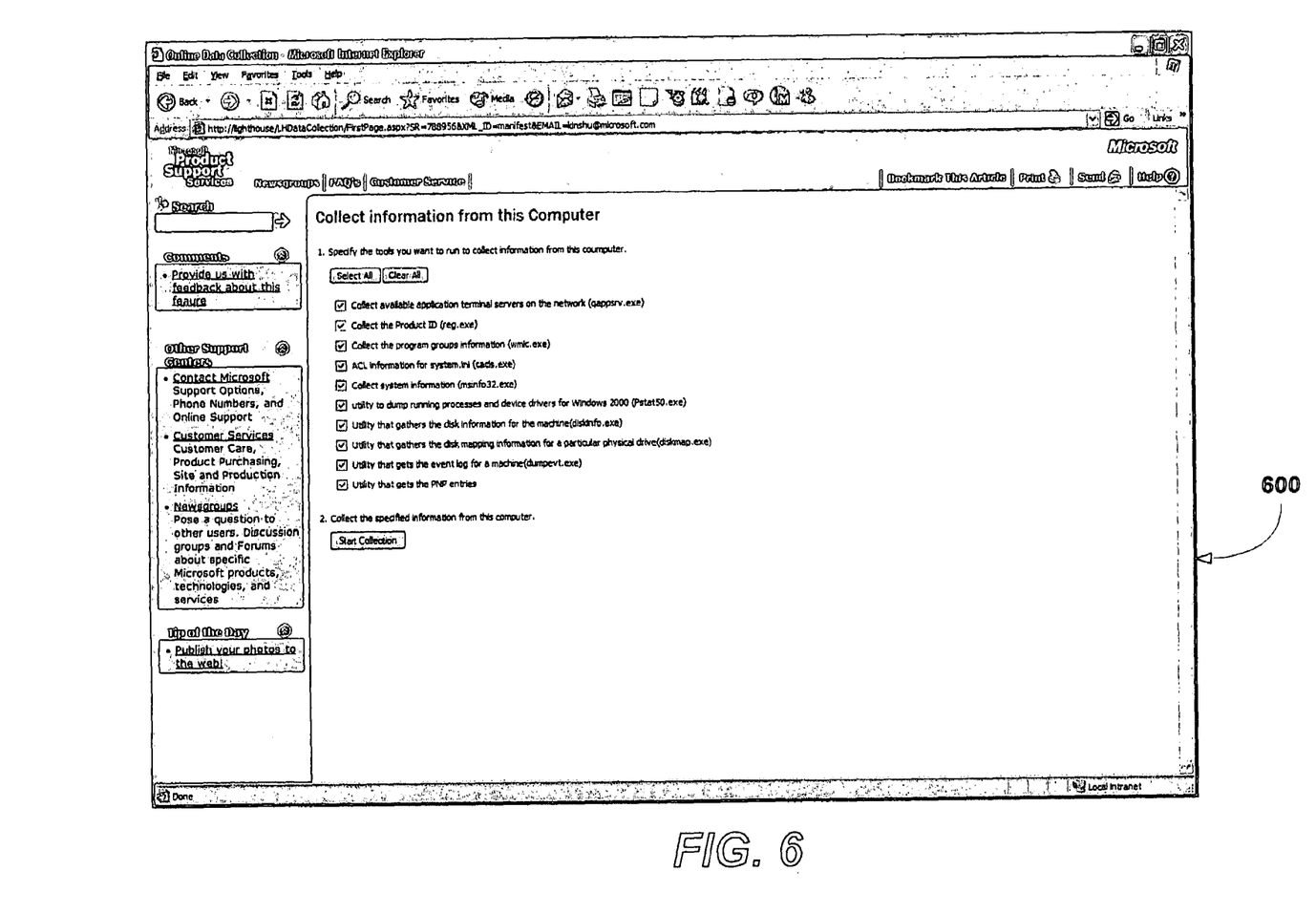

FIG. 6 is a representation of an interface 600 of what a user might see after electing to collect data from the current computer via FIG. 5, (although the interface would be similar if electing to collect data from another computer). As is shown, the user may make a number of individual selections corresponding to tools and associated data that can be collected for analysis and the like. In the example of FIG. 6, a user selects the tools to run via checkboxes, such as those tools obtained via a manifest processing as described above, wherein the manifest may have been chosen based on a particular problem the user is experiencing, as also described above. When ready, the user can start the collection such as via the button labeled "Start Collection" in FIG. 6.

Figure 7:
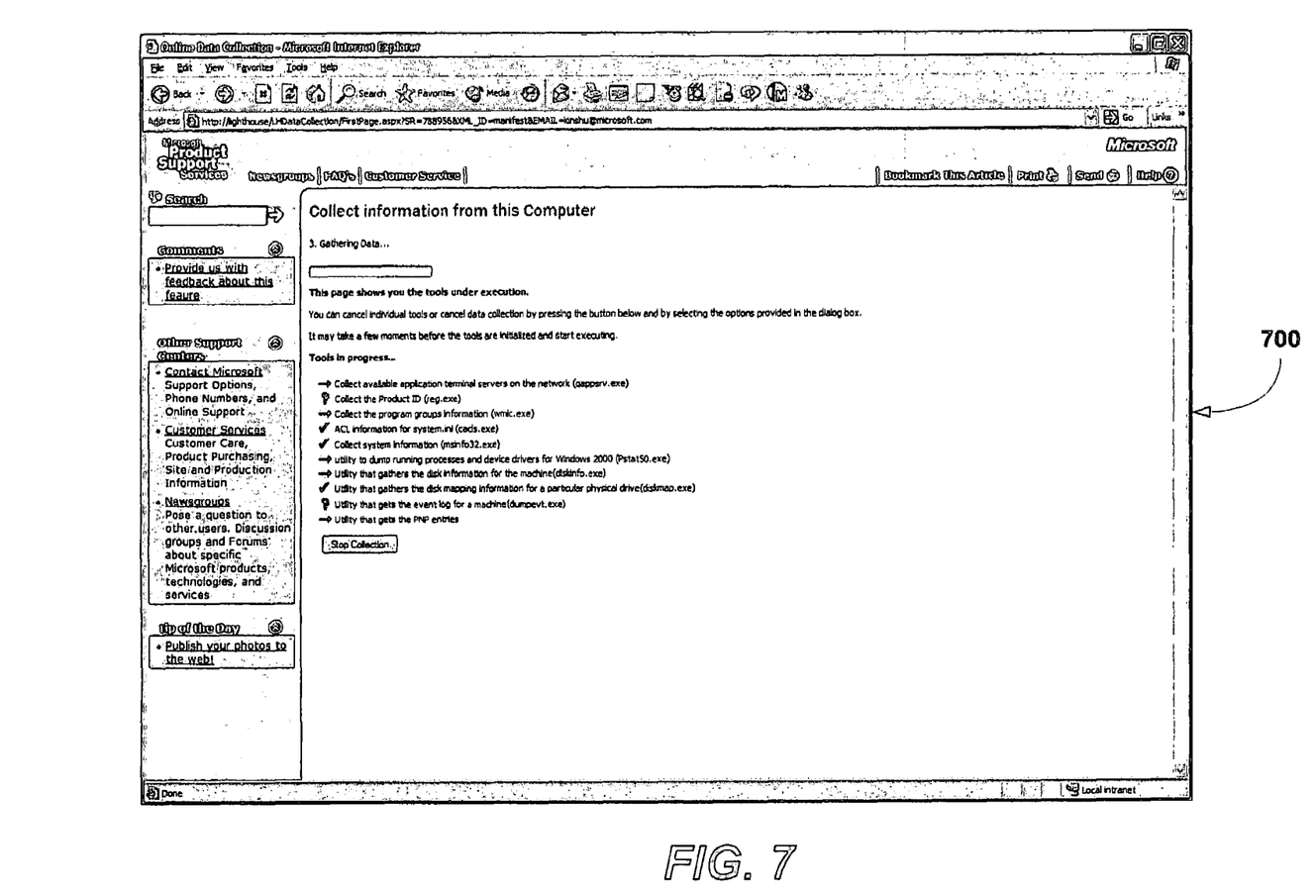

FIG. 7 shows to the user an interface 700 corresponding to the progress of the tools under execution. In general, FIG. 7 shows the user that the collection process, which may take time, is working. As is readily apparent, FIG. 7 also gives the user a mechanism to cancel individual tools or the entire data collection process, such as via a selectable dialog (not shown).

Figure 8:
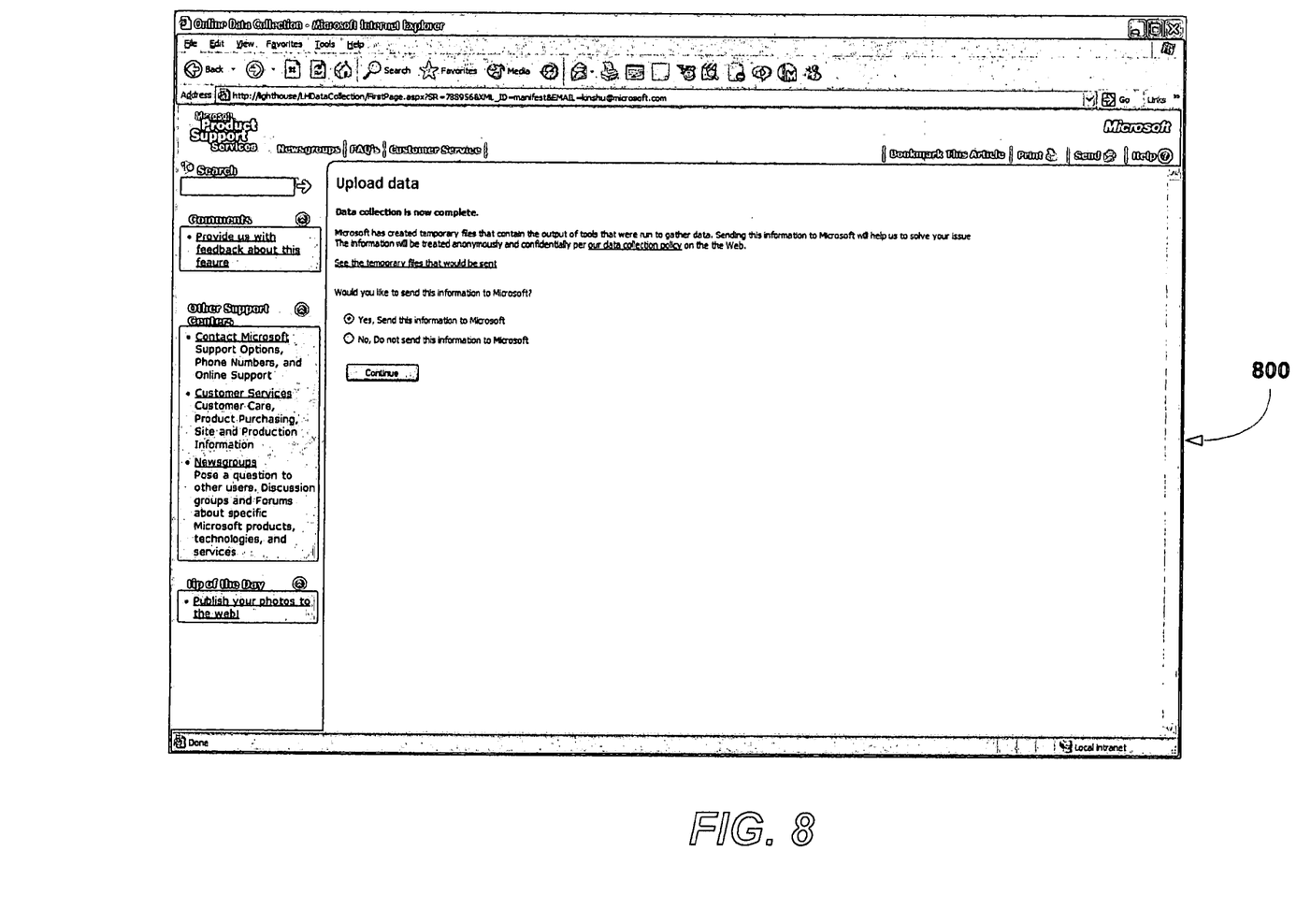

FIG. 8 shows a screenshot of an interface 800 indicative of when the data collection is complete. At this time, the user has the opportunity to see the data files that are about to be sent and determine whether to send the data, e.g., for privacy reasons.

Figure 9:
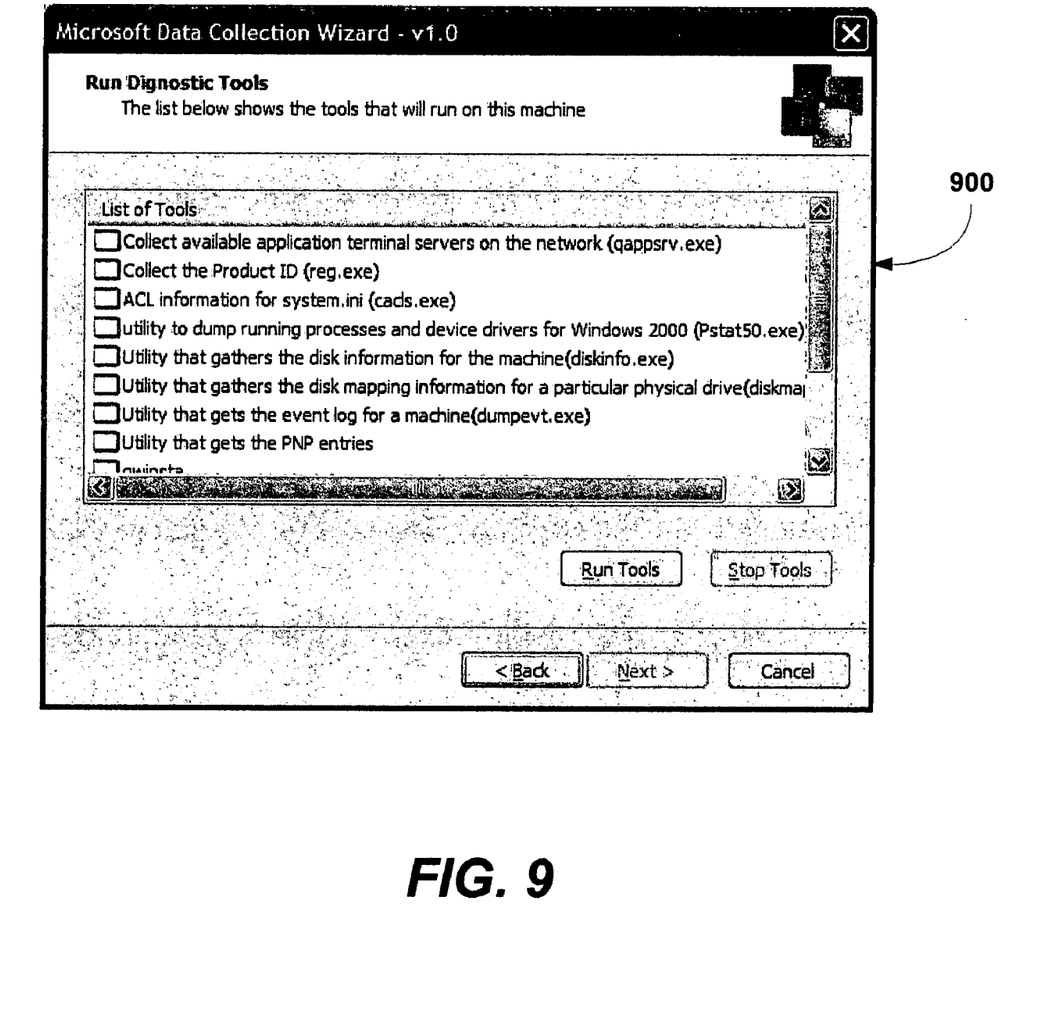
FIGS. 9 and 10 are representations of example screen shots seen by a hypothetical user when interacting with a wizard to obtain remote support, in accordance with an aspect of the present invention.
Figure 10:
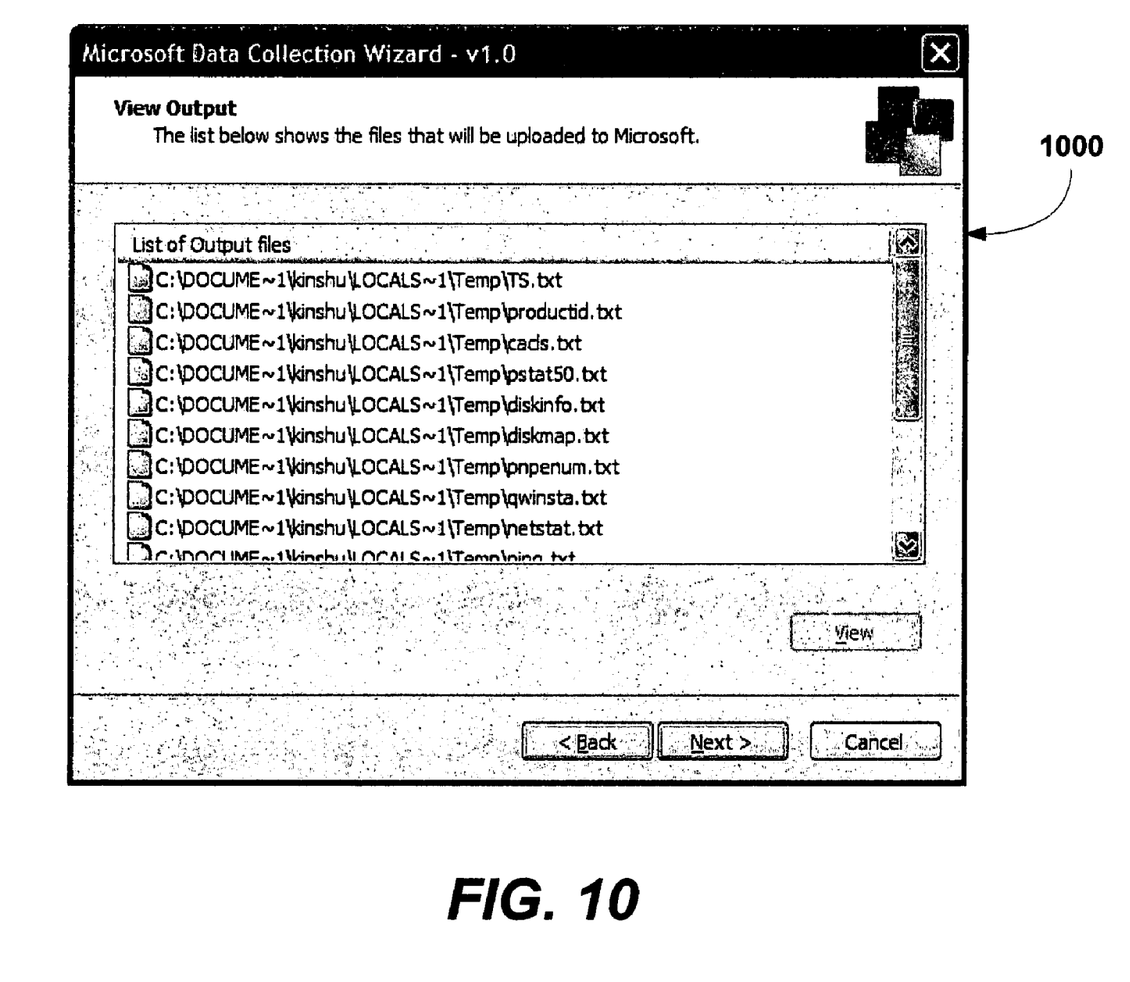

FIG. 9 provides an alternative way of collecting data via a wizard interface 900 or the like, such as following an introductory screen (not shown). In FIG. 9, similar to FIG. 6, the list of tools with explanations is provided for individual selection of each. If the user selects tools and elects the "Run Tools" button, the corresponding data files will be presented to the user as shown in the interface 1000 of FIG. 10. In FIG. 10, similar to FIG. 7, the user can select individual data files for uploading to the remote support center, with an option to view the contents of any data files before committing to sending them. If the user selects the "Next" button, the files are uploaded. Again, the user remains in control of what data is collected and/or sent for analysis.

As can be seen from the foregoing detailed description, there is provided a method and system by which problem-diagnosing tools are sent to a user's computer by a support entity, with little user intervention required to execute the correct tools. Data is packaged by the tools and sent back to support, such as to provide a solution, which may be based on automated analysis. The method and system provide a consistent and straightforward way to provide support to computer users, and thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for automating computer support, the method comprising:

detecting a type of computer-related problem on a user machine;

selecting a manifest from a plurality of manifests based upon the detected type of computer-related problem, each of the plurality of manifests being a named data file;

the selected manifest identifying a set of one or more tools that when executed collects data for analysis with respect to diagnosing the computer-related problem;

the selected manifest identifying the location from which each of the set of one or more tools may be downloaded;

for each of the set of one or more tools, the selected manifest identifying the current version of the tool, how the tool should be installed, and what parameters should be specified;

the selected manifest providing information comprising parameters for running each of the set of tools with an appropriate configuration;

the selected manifest describing what output should be collected;

providing a control mechanism to interpret the selected manifest;

the control mechanism automatically loading and executing on the user machine;

the control mechanism interpreting the manifest;

when necessary, the control mechanism installing one or more of the set of one or more tools;

the control mechanism executing each tool identified in the manifest upon the user machine;

each tool, when executed by the control mechanism, collecting data from the user machine;

the control mechanism executing a reporting program;

the reporting program collecting and packaging the data collected by the tools; and the reporting program delivering the packaged data to a central support depository.

2. The method of claim 1 further comprising providing a mechanism that when clicked on links to the selected manifest.

3. The method of claim 2 further comprising providing a URL that when clicked on links to the selected manifest.

4. The method of claim 1 further comprising sending information about the selected manifest in an email message.

5. The method of claim 1 further comprising sending information about the selected manifest in an instant message.

6. The method of claim 1 further comprising providing a site that may be accessed via a browser.

7. The method of claim 1 further comprising wherein for each tool, the control mechanism determining whether the tool needs to be downloaded and installed to the use machine, and when so, the control mechanism downloading and installing that tool.

8. The method of claim 1, further comprising:

receiving user input comprising information identifying data to send;

the reporting program packaging only the identified data for transmission.

9. The method of claim 1 further comprising transmitting the control mechanism to the user machine.

10. A tangible computer-readable storage medium having encoded thereon computer-executable instructions which, when executed perform the method of claim 1.

* * * * *

UNITED STATES PATENT AND TRADEMARK OFFICE
CERTIFICATE OF CORRECTION

| | | |
|---|---|---|
| PATENT NO. | : 7,464,102 B2 | Page 1 of 1 |
| APPLICATION NO. | : 10/722717 | |
| DATED | : December 9, 2008 | |
| INVENTOR(S) | : John D. Colleran et al. | |

It is certified that error appears in the above-identified patent and that said Letters Patent is hereby corrected as shown below:

In column 14, line 26, in Claim 10, delete "executed" and insert -- executed, --, therefor.

Signed and Sealed this
Tenth Day of May, 2011

David J. Kappos
*Director of the United States Patent and Trademark Office*